May 8, 1934.  V. P. WILLIAMS  1,957,515
BUMPER
Filed Oct. 2, 1933  5 Sheets-Sheet 2

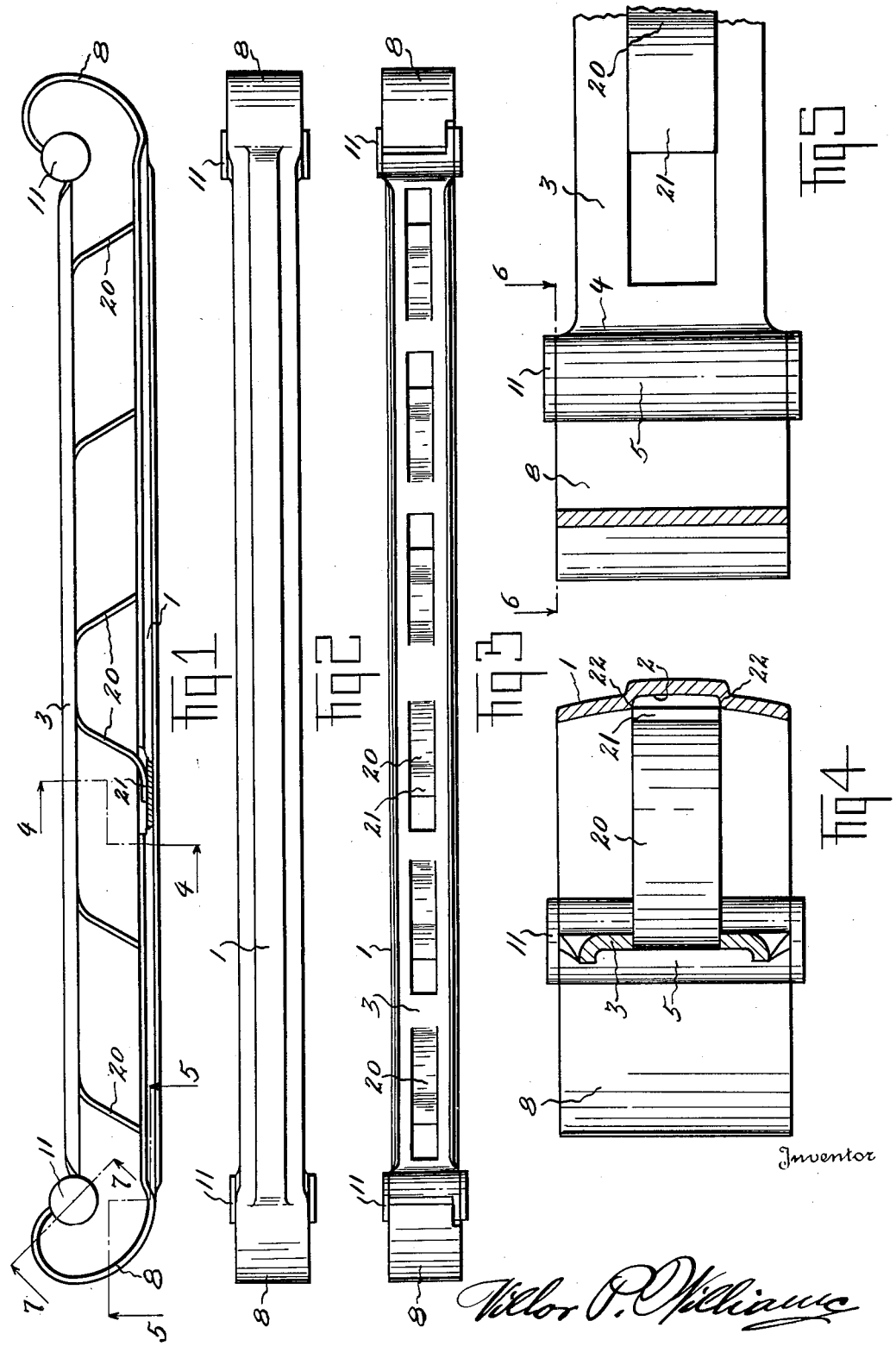

Inventor
Victor P. Williams

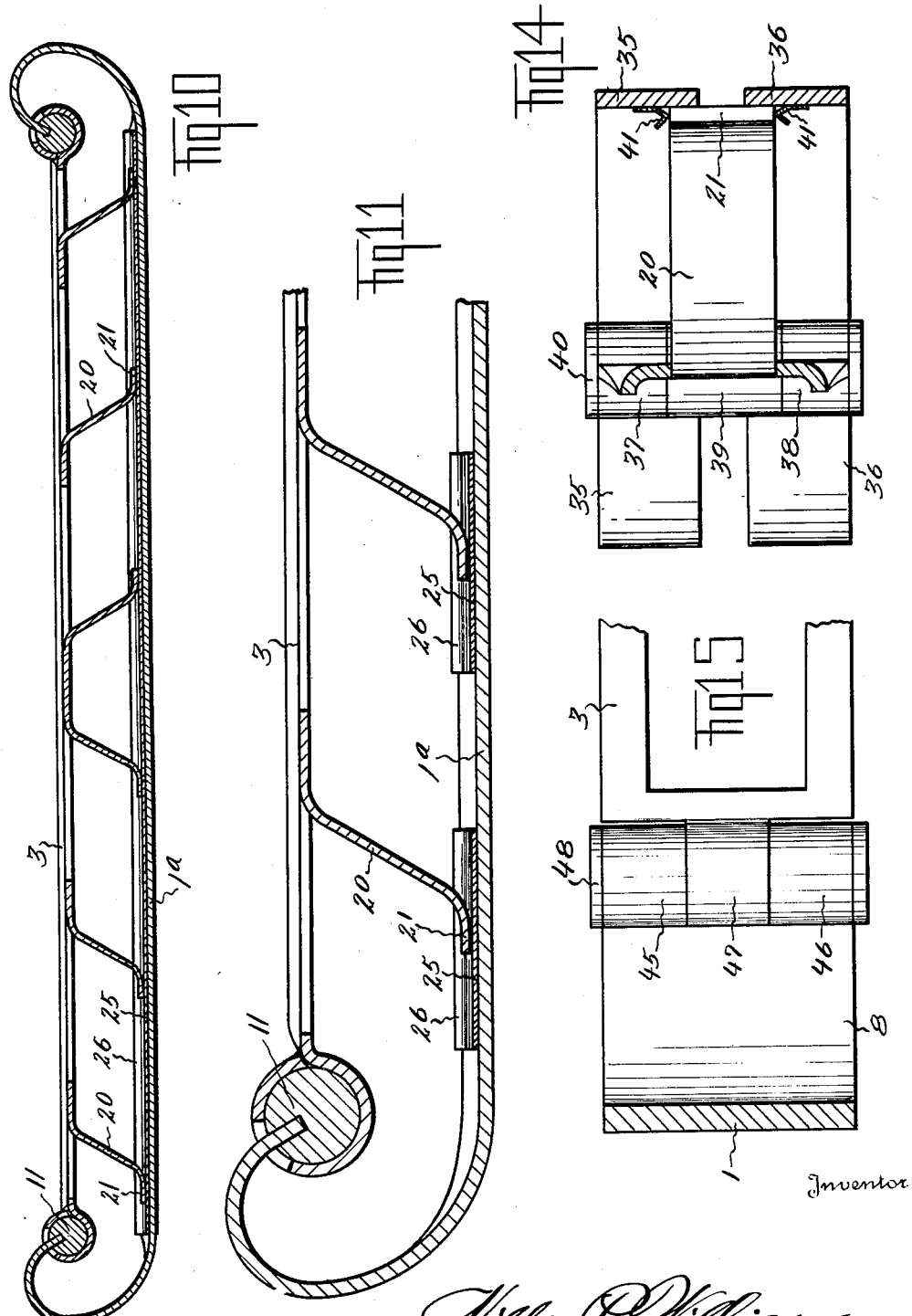

May 8, 1934.  V. P. WILLIAMS  1,957,515
BUMPER
Filed Oct. 2, 1933   5 Sheets-Sheet 4
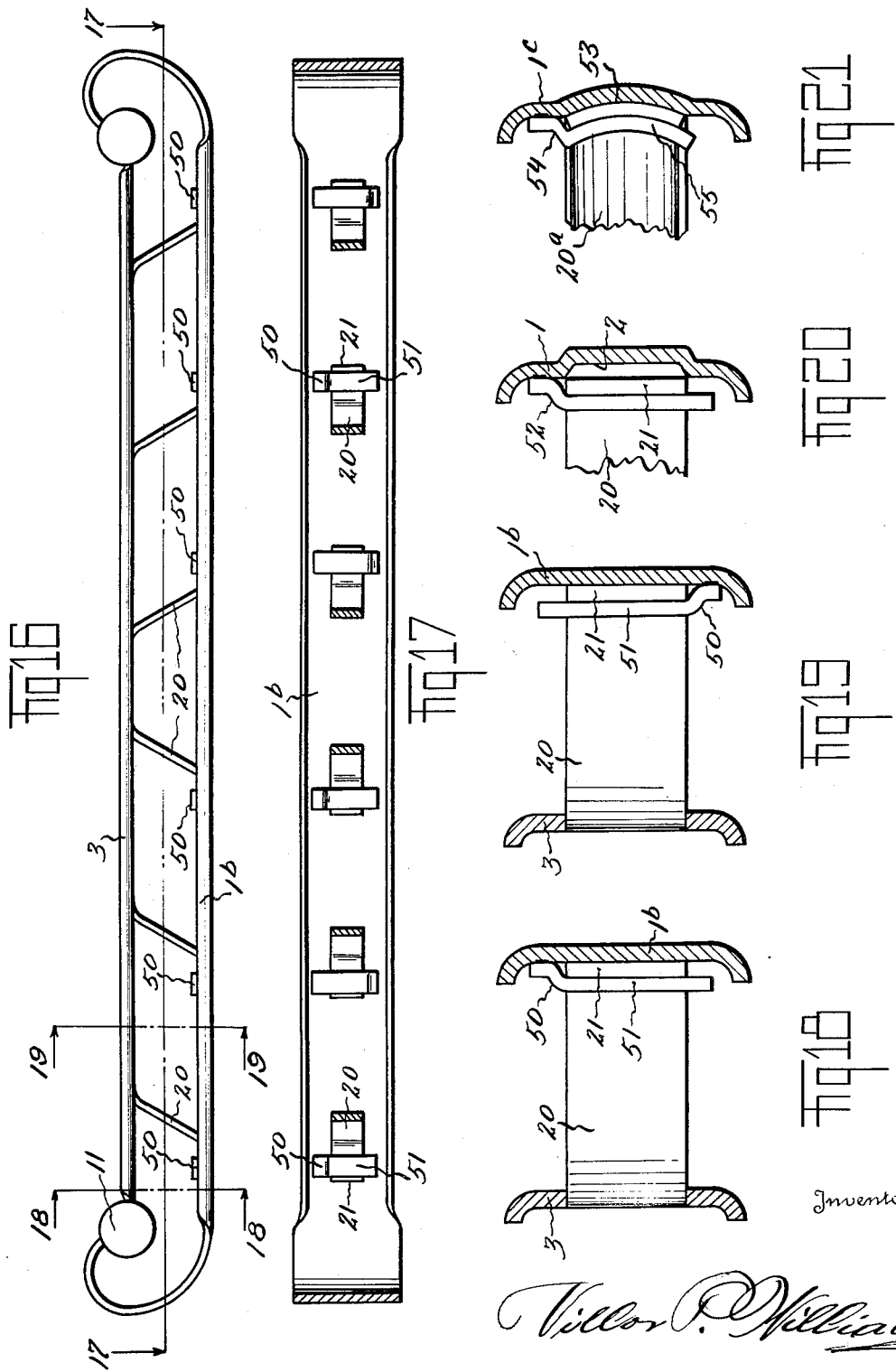

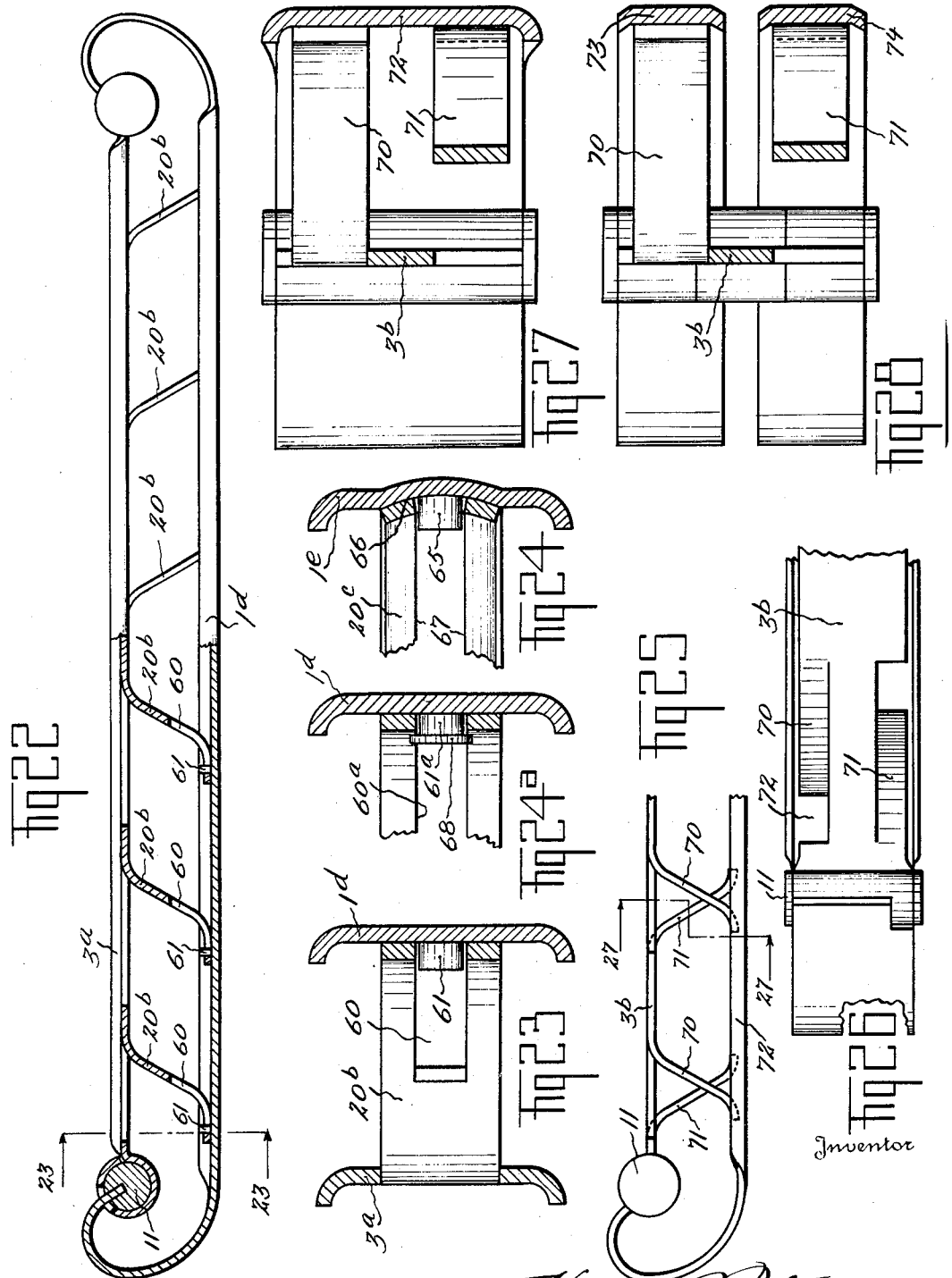

Patented May 8, 1934

1,957,515

UNITED STATES PATENT OFFICE 1,957,515

BUMPER

Villor P. Williams, Baltimore, Md., assignor to Estelle P. Williams, Baltimore, Md.

Application October 2, 1933, Serial No. 691,841

12 Claims. (Cl. 293—55)

This invention relates to bumpers for automobiles and similar vehicles and has for its general object to provide a bumper of this character which is capable of offering a progressive resistance to the transmission of shocks to the vehicle by which it is carried, whereby the bumper is capable of absorbing shocks of varying intensity; also to provide a bumper of this character which will absorb shocks in this manner, regardless of the particular part of the front impact portion thereof to which the shocks or blows are applied.

Another object of this invention is to provide a bumper of an essentially simple nature, composed of only two principal parts disposed in a horizontal plane and having therebetween efficient spring elements, the device being symmetrically proportioned.

A further object is to produce a bumper in which the spring elements are maintained at all times under moderate compression, these springs acting as connections between the main elements which comprise a front impact bar and a rear supporting bar.

Another aim of this invention is the provision of a bumper having a minimum bulk, with full freedom for the desired character of buffer motion, and is supported and constructed in a way to minimize undesired looseness and rattling.

A further purpose is in the provision of a bumper that can be manufactured at a moderate cost and is easily applied to any type of vehicle of the class mentioned.

These and like objects are accomplished by the simple and novel construction and arrangement of parts hereafter described and illustrated in the accompanying drawings forming a part thereof, and in which:—

Fig. 1 is a plan view of the bumper.

Fig. 2 is a front view of the bumper.

Fig. 3 is a rear view of the bumper.

Fig. 4 is a sectional view of the bumper taken on line 4—4, Fig. 1.

Fig. 5 is a detail sectional view taken on line 5—5, Fig. 1.

Fig. 10 is a longitudinal sectional view taken on line 10—10, Fig. 9.

Fig. 11 is a partial longitudinal sectional view similar to that of Fig. 10 showing a further modified form.

Fig. 14 is a sectional view similar to Fig. 4 showing the impact bar formed of vertically spaced bars.

Fig. 15 is a detail sectional view similar to Fig. 5 showing the impact bar and supporting bar connected by a conventional hinge.

Fig. 16 is a plan view of a further modified form of bumper.

Fig. 17 is a longitudinal sectional view taken on line 17—17, Fig. 16.

Figure 7:
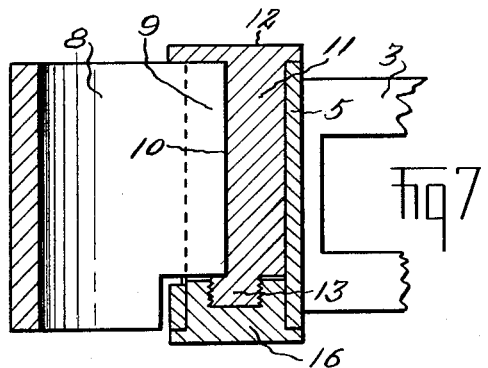
Fig. 7 is a detail sectional view of the hinge connection taken on line 7—7, Fig. 1.

Figs. 18—19 are detail sectional views taken on lines 18—18 and 19—19, respectively, on Fig. 16.

Figs. 20—21 are detail sectional views similar to that of Fig. 18 showing the construction therein used with modified forms of impact bars and spring fingers.

Fig. 22 is a sectional plan view of an additional modified form of bumper construction.

Fig. 23 is a detail sectional view taken on line 23—23, Fig. 22.

Fig. 24 is a sectional view similar to that of Fig. 23 showing a modified form of front impact bar.

Fig. 24a is a detail sectional view illustrating an alternate form of construction for guiding the spring fingers.

Fig. 25 is a plan view of still an additional modified form of bumper construction.

Fig. 26 is a rear view of the bumper of Fig. 25.

Fig. 27 is a sectional view taken on line 27—27, Fig. 26.

Fig. 28 is a sectional view similar to that of Fig. 27 showing a double impact bar.

In the embodiments of the invention selected for illustration and description, referring to Figs. 1 to 7 inclusive, the part designated by the reference character 1 is the impact member or bar of the bumper which may be made of any suitable material and is preferably formed of a strip of flexible steel, provided along its longitudinal central portion with a raised curved portion which on the inner side of the impact bar forms a concave recess or depression 2. Spaced rearwardly of the impact bar 1 and in the same horizontal plane therewith is a supporting bar 3 which is preferably made of spring steel. The supporting bar 3 in the construction shown in Figs. 1 to 7 is preferably made of channel form the ends of the supporting bar 3 merging into straight portions 4, bent back upon themselves to form eyes 5 which are closed by means of the weld 6, thus insuring the eyes against ever opening. Each of the eyes 5 are provided with a slot 7 which extends down from the top of the eye for a purpose to be hereinafter described.

The ends of the impact bar 1 are preferably straight and are curved back as at 8, clearly shown in Fig. 1, each end portion terminating in an end of reduced width 9, see Fig. 7. Each reduced end fits in a slot 10 provided in a pin 11 having a diameter substantialy equal to the diameter of the eyes 5, the pin 11 being formed with a head 12 at its upper end and at its lower end with a threaded extension 13 of reduced diameter. The ends 9 of the impact bar 1 are welded along the edges of the slot 10 as at 15 to the pins 11 thus forming an integral unit, which is adapted to be assembled to the suporting bar 3 by merely inserting the pins 11 downwardly into the eyes 5, the whole being held in assembled relation by the nuts 16 which fit into the bottom of the eyes 5, all of which is clearly shown in Fig. 7.

Figure 6:
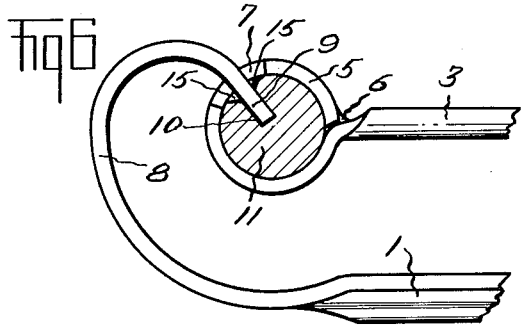
Fig. 6 is a detail sectional view taken on line 6—6, Fig. 5.

Referring to Fig. 6 it will be noted that the slot 7 in the eye 5 is given a substantial width whereby the end 9 of the impact bar 1 extending therethrough is permitted to have sufficient clearance for rotational movement in either direction from the normal position shown therein upon movement of the impact bar 1, the pin 11 of course turning in the eye 5.

Between the impact bar 1 and supporting bar 3 are positioned longitudinally spaced spring elements or fingers 20. These spring fingers 20 are preferably struck out of the central portion of the supporting bar 3 and are so formed as to be disposed at an angle to the plane of the supporting bar 3, the ends 21 of said fingers serving to slidably engage the impact bar 1. The spring fingers 20 are made of a width substantially equal to the width of the longitudinal depression 2 formed in the impact bar 1 and upon assembly of said impact bar to the supporting bar 3 in the manner as described above, each of said spring fingers 20 will undergo a slight compression sufficient to cause the edges of the spring finger ends 21 to firmly engage as at 22—22, the side walls of the concave depression 2. This manner of engagement of the spring fingers ends 21 with the impact bar 1 will prevent rattling of the spring fingers as well as up and down movement of the same relative to the impact bar. The depression 2 serves furthermore as a guide for the spring finger ends 21 when the same are compressed upon inward movement of the impact bar 1 as the result of a collision or otherwise.

At this point it is to be distinctly understood that this invention is not limited to the precise number of spring fingers shown nor to the position of the same and that while the preferred form of the invention is to have the spring fingers struck out of the body of the supporting bar 3, the same may nevertheless be separable and attached to said supporting bar 3 by rivets, bolts or welding.

Figure 8:
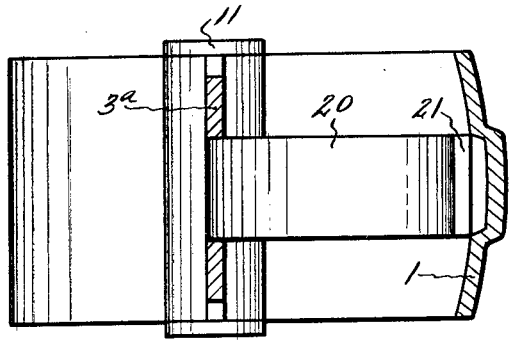
Fig. 8 is a sectional view similar to Fig. 4 of a modified form of rear bumper bar.

In the form of bumper shown in Figs. 1 to 7 the rear supporting bar 3 is shown to be of channel cross-section which provides a bar of extreme rigidity. However in certain cases involving cost and the question of expediency it is sometimes desirable to form the rear supporting bar of flat spring stock such as 3a, Fig. 8. In this case the spring fingers 20 are struck out of the bar 3a in exactly the same manner as in the bar 3, the bumper otherwise having the same characteristics as that shown in Fig. 1.

Figure 9:
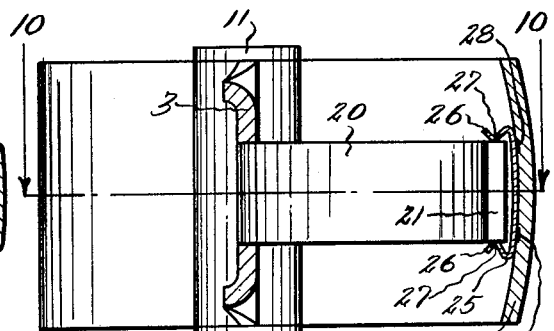
Fig. 9 is a sectional view similar to Fig. 4, showing a modified form of bumper construction.

Figs. 9, 10, and 11 show in section a bumper possessing the general characteristics of that of Fig. 1 except that the inside of the impact bar is provided with a resilient guide for the spring finger ends 21. In Fig. 9, the impact bar 1a is formed of slight curvature transversely of the bar with the concave side on the inside and without the concave recess 2 of the impact bar 1 of Fig. 1. In order to guide the ends 21 of the spring fingers 20 there is provided a channel shaped member 25 of comparatively thin sheet metal having resilient properties, which is located along the longitudinal center on the inside of the impact bar 1a. Each of the arms 26 of the channel 25 are formed with inwardly directed bowed portions 27 the distance between said bowed portions being somewhat less than the width of said spring finger ends 21, the arms 26 functioning to all intents and purposes as spring clamps. Upon assembly of the bumper the spring finger ends 21 are forced between the spring arms 26 which under the tension thus created tightly press against the side edges of said spring finger ends. It is accordingly apparent that the spring arms 26 of the channel member 25 will not only guide the ends 21 of the spring fingers 20 but will also prevent vertical oscillation of the same as well as rattling and chattering.

The channel member 25 may be formed in sections one for each spring finger, see Fig. 11, or it may be in one piece extending substantially the full length of the impact bar 1a, see Fig. 10. In either case the channel member 25 is permanently secured to the impact bar by rivets, bolts, screws, brazing or spot welding. In Fig. 9 the channel member 25 is shown spot welded as at 28.

In some cases it may be desirable to apply the spring features 26 of the channel guide 25 to an impact bar 1 of the form shown in Figs. 1 to 7. Accordingly there is provided on each side of the concave recess 2, a longitudinal spring clamping member 30 that is substantially U-shaped in cross section, one side 31 being permanently secured in any desired manner to the inside of the impact bar 1, while the other side 32 is adapted to resiliently press against an adjacent side of the spring finger ends 21, in much the same manner as the spring arms 26 engage the spring finger ends 21 in Fig. 9. The ends 21 of the spring fingers 20 are thus guided in the recess 2 and are restrained against vertical oscillations and rattling by the spring members 30.

Figure 13:
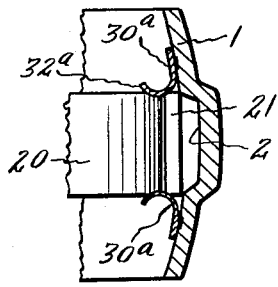

In Fig. 13, the resilient clamping members 30a are substantially of the same form as the clamping members 30, but so attached to the impact bar 1 as to extend slightly inwardly of the recess 2 whereby the spring finger ends 21 upon being pressed therebetween into position on the recess 2 will be resiliently restrained thereagainst by the projecting portions 32a of said clamping members 30a which bear against the adjacent side edges of said spring finger ends.

It is to be understood that the resilient clamping members 30 and 30a may be formed in sections or in one piece in the same manner as the channel member 25 above referred to.

Figure 12:
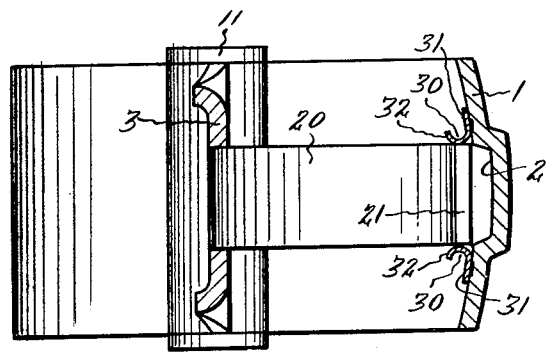
Figs. 12 and 13 are sectional views similar to Fig. 4 showing additional modified forms of bumper constructions.

Fig. 14 shows a cross-sectional view of a bumper of the type hitherto described wherein the single impact bar 1 is replaced by two parallel spring steel bars 35—36 arranged in the same vertical plane and spaced from each other. These impact bars 35—36 may either be formed flat, as shown or of concave-convex curvature with the convex side outwardly disposed. The ends of the impact bars 35—36 are provided respectively with eyes 37—38 which register with an eye 39 at each end of the supporting bar 3 to form a conventional hinge connection pivotally held together by the pin 40. The pin 40 may be formed either as a bolt or a rivet. The rear supporting bar 3 is provided with spring fingers 20 of the same form as previously described, the ends 21 thereof engaging in sliding relation the inner adjacent portions of the impact bars 35—36. To guide the ends 21 of the spring fingers 20 there is provided on the inside of each of the impact bars 35—36 a resilient clamping guide member 41 of the same general characteristics as the resilient clamping members 30 and 30a shown on the bumpers of Figs. 12 and 13. The resilient clamping guide members 41 are rigidly secured as by rivets, bolts, screws, brazing or spot welding to the impact bars 35—36, said guide members being spaced apart a distance slightly less than the width of the spring finger ends 21 so that when positioned therebetween the clamping members 41 will be tensioned to tightly press against the adjacent sides of said spring finger ends.

With respect to the modification shown in Fig. 14, it may be advisable to utilize the resilient clamping guide members 41 in one piece extending substantially the full length of the impact bar as indicated in Fig. 10, although it is to be understood that said guide members may be employed in sections if desired, a pair of such sections for each spring finger end 21 as indicated in Fig. 11.

In some cases it may be desirable to utilize in the bumper constructions illustrated in Figs. 1 to 13, a conventional hinge connection in place of the preferred pivotal connection illustrated in detail in Figs. 6 and 7. Such a hinge connection is shown in Fig. 15 wherein the end 8 of the impact bar 1 is provided with spaced eyes 45—46 adapted to receive therebetween in registry an eye 47 formed on the supporting bar 3. A pin 48 which may be either a bolt or rivet extends through said eye and pivotally connects the impact bar 1 and supporting bar 3.

In Figs. 16, 17, 18 and 19 there is illustrated a bumper employing an entirely different method of guiding the spring fingers. This bumper comprises a channel shaped impact bar 1b provided with substantially flat outer and inner faces, the impact bar 1b being assembled with a supporting bar 3 carrying the struck out spring fingers 20 in the same manner as described above with respect to the bumper illustrated in Fig. 1. Guiding the ends 21 of the spring fingers 20 are straps 50 which are secured at one end in any desired manner to the impact bar 1b, as shown in Figs. 17, 18 and 19. The body portions 51 of the straps 50 are offset and are spaced from the surface of the impact bar 1b a distance substantially equal to the thickness of the spring fingers, the free ends of the straps preferably extending beyond said fingers. It is accordingly apparent that while the spring fingers 20 are freely guided, the impact bar 1b is incapable of any up and down movement by virtue of the alternate manner of attaching the straps 50 to said impact bar. If desired the straps 50 may be made resilient so that the body portions 51 will exert pressure on the spring finger ends 21 thus preventing any possible rattling and objectionable noises.

The straps 50 may also be provided in the manner described above on a bumper such as shown in Fig. 1, Fig. 20 being illustrative. The impact bar 1, having the longitudinal recess 2, has attached thereto in any suitable manner the strap 52 at a point adjacent to one side of the recess. In this case the spring fingers 20 are not only guided by the recess 2 but are prevented from springing out of position by the straps 52.

In Fig. 21, the impact bar 1c is formed centrally with a longitudinal curved recess 53 of somewhat more pronounced curvature than the recess 2 in the impact bar 1. Slidably fitted within the recess 53 and snugly engaging the same are the spring fingers 20a only one of which is shown, which spring fingers are formed for a substantial part thereof with a curvature corresponding to the curvature of the recess 53. These spring fingers 20a as hitherto described may either be struck out of the supporting bar or may be separately secured thereto in any suitable manner. Straps 54 are provided for each spring finger 20a and are positively secured to the impact bar 1c in exactly the same manner as the straps 52 are positioned and secured to the impact bar 1, Fig. 20. The straps 54 are formed with offset portions 55 which are adapted to nest in guiding relationship with the curved spring fingers 20a which in turn nest in the recess 53. The straps 54 if so desired may be made somewhat resilient so as to press the spring fingers 20a in the recess 53.

The manner of guiding the spring fingers on the impact bar of the bumper illustrated in Figs. 16, 17, 18 and 19 by means of reversably positioned straps 50 may be readily adapted to the double impact bar 35—36, of the bumper shown in Fig. 14. In such a case alternate straps are attached to the same impact bar, that is, alternate straps that extend with the free portion downwardly are attached to one of the impact bars, while other alternate straps that extend with the free portion upwardly are attached to the other impact bar.

Figs. 22, 23 and 24 disclose still another alternate method of guiding the spring fingers on the impact bar. In this instance each of the spring fingers 20b carried by the supporting bar 3a are formed with a centrally positioned longitudinally extending slot 60 along the portion thereof that comes into engagement with the impact bar 1d. Rigidly secured to the inside of the impact bar 1d in any desired manner are a plurality of studs 61, each stud fitting within a slot 60 of an adjacent spring finger 20b as shown in Fig. 22, the studs 61 being of such a length as to prevent the spring fingers from ever jumping off of said studs. Movement of the impact bar 1d as a result of impacts will cause the spring fingers to flex inwardly the slotted ends thereof sliding on the impact bar 1d, which movement is guided by the fixed studs 61. The studs 61 function also to prevent vertical oscillatory movements of the impact bar 1d relative to the supporting bar 3a and the spring fingers 20b.

In Fig. 24, the studs 65 are fixed in any suitable manner to the bottom of a longitudinal curved recess 66 formed on the impact bar 1e. Spring fingers 20c, only one of which is shown, are each formed with a slot 67 similar to the slots 60 in the spring fingers 20b of Fig. 22, the spring fingers 20c being transversely curved to slidably fit in the recess 66 of the impact bar 1e in much the same manner as the spring fingers 20a, Fig. 21, slidably engage the recess 53 in the impact bar 1c. The studs 65 are also made of sufficient length to prevent the spring fingers 20c from ever jumping off of the same when the bumper is in service.

The studs 61 and 65 are preferably attached to their respective impact bars by welding, though the same may be riveted or threaded thereto.

In some cases it may be desirable to positively lock the spring fingers 20b—20c against transverse movement while permitting longitudinal movement relative to the impact bars 1d—1e by upsetting the ends of the studs after the assembly of the bumper. This construction is clearly shown in Fig. 24a, wherein the stud 61a is upset as at 68, a sufficient amount to extend slightly beyond the sides of the slot 60a.

The bumper construction illustrated in Figs. 25, 26 and 27 differs from the preceding embodiments by having the spring fingers struck out of the side portions of the supporting bar. Preferably the supporting bar 3b is formed initially flat and has struck out along one side portion a row of spaced spring fingers 70, and along the other side portion a row of similarly spaced spring fingers 71, those of one row being oppositely disposed with respect to the adjacent ones in the other row as clearly shown in Fig. 25. The impact bar 72 is also substantially flat along the major portion of its width as for example the impact bar 1b, Fig. 18. The impact bar 72 is connected to the supporting bar 3b in the same manner as the impact bar 1 is assembled to the supporting bar 3, as illustrated in Figs. 1 to 7, whereby the spring fingers 70—71 will resiliently engage the impact bar 72. The ends of the spring fingers 70—71 may be guided on the impact bar 72 by any one of the various embodiments above described. While the supporting bar 3b is shown provided with parallel rows of spring fingers 70—71, only one such row of spring fingers may be utilized if so desired.

Referring to Fig. 28, the double row of spring fingers 70—71 formed on the supporting bar 3b slidably and resiliently engage a double impact bar comprising the bars 73—74 which is substantially of the same form as that illustrated in Fig. 14, described above, one row of spring fingers 70 engaging the impact bar 73 while the other row of spring fingers 71 engage the impact bar 74. Again these spring fingers 70—71 may be guided on the impact bars 73—74 by any one of the several embodiments above described. The impact bars 73—74 are assembled to the supporting bar 3b in exactly the same manner as described hitherto with relation to the showing in Fig. 14.

From the above detailed description of the various alternate forms of bumper constructions each of which embody essentially the same basic principle of this invention it will be apparent that an exceedingly simple and extremely efficient bumper has been achieved.

While various embodiments of the invention have been illustrated and described it must be understood that the same may be modified and constructed in other ways within the scope of the appended claims.

I claim:—

1. A bumper comprising a supporting bar, an impact bar spaced therefrom and in the same horizontal plane therewith, means pivotally connecting the ends of said bars, and a plurality of imperforate spaced spring fingers struck out of the supporting bar, the free ends of said spring fingers slidably engaging the impact bar, for free longitudinal movement thereon.

2. A bumper comprising a supporting bar, an impact bar provided with rearwardly curved resilient ends said impact bar being disposed parallel with said supporting bar and in the same horizontal plane therewith, means pivotally connecting the ends of said bars, and a plurality of imperforate spaced spring fingers struck out of the supporting bar, the free ends of said spring fingers slidably engaging the impact bar, for free longitudinal movement thereon.

3. A bumper comprising an impact bar provided with resilient ends, a supporting bar positioned between said ends and pivotally connected thereto, a row of imperforate spaced spring fingers struck out of the body portion of said supporting bar with the free ends of said spring fingers slidably engaging the impact bar for free longitudinal movement thereon, the ends of the outermost spring fingers being directed towards the ends of said bars.

4. A bumper comprising an impact bar provided with resilient ends, a supporting bar positioned between said ends and pivotally connected thereto, a plurality of spaced spring fingers each being integrally formed at one end with the supporting bar and the other end thereof slidably engaging the impact bar, and means formed directly on the impact bar for guiding the free ends of said spring fingers.

5. A bumper comprising an impact bar provided with resilient ends, a supporting bar positioned between said ends and pivotally connected thereto, a row of spring fingers each being integrally formed at one end with the supporting bar and the other end thereof movably engaging the impact bar, and a recess formed in the impact bar and extending substantially the full length thereof adapted to receive in guiding engagement said movable spring finger ends.

6. In a bumper comprising spaced bumper elements, one of said elements having an eye at each end, each eye being formed with an axially extending slot, a headed pin formed with a threaded extension of reduced diameter rigidly secured to each end of the other member and adapted to be slid into said eyes from one end thereof upon assembly of the bumper elements, and a capped nut adapted to fit in the other end of said eyes in threaded engagement with said pins to lock the same against any axial movement relative to said eyes, said slot being of a width sufficient to permit oscillatory movements of the other of said members.

7. A bumper comprising an impact bar provided with resilient ends, a supporting bar positioned between said ends and pivotally connected thereto, a plurality of spaced spring fingers each having one end rigidly fixed relative to the supporting bar and the other end thereof slidably engaging the impact bar, and resilient guide means fixed to the impact bar and engaging at least one of the sides of the spring fingers.

8. A bumper comprising an impact bar provided with resilient ends, a supporting bar positioned between said ends and pivotally connected thereto, a plurality of spaced spring fingers each having one end rigidly fixed relative to the supporting bar and the other end thereof slidably engaging the impact bar, and resilient guide means fixed to the impact bar and engaging the longitudinal side edges of the spring fingers.

9. A bumper comprising an impact bar, a supporting bar spaced therefrom, means pivotally connecting the ends of said bars, a row of spring fingers struck out of the body of said supporting bar and each having one end rigidly fixed relative to the supporting bar and the other end thereof movably engaging the impact bar, and means fixed to said impact bar and individual to each of said spring fingers for guiding the movement of the same on said impact bar.

10. A bumper comprising an impact bar, a supporting bar spaced therefrom, means pivotally connecting the ends of said bars, a row of spring fingers unitarily associated with said supporting bar and provided with end portions adapted to movably engage said impact bar, a row of strap members rigidly connected to said impact bar and provided with free offset portions spaced from said impact bar there being a strap for each spring finger, said offset strap portions projecting over the movable portions of said spring fingers to guide the same.

11. A bumper comprising an impact bar, a supporting bar spaced therefrom, means pivotally connecting the ends of said bars, a row of spring fingers unitarily associated with said supporting bar and provided with end portions adapted to movably engage said impact bar, a row of strap members rigidly connected to said impact bar and provided with free offset portions spaced from said impact bar there being a strap for each spring finger, said offset strap portions projecting over the movable portions of said spring fingers to guide the same, certain of said straps projecting downwardly and certain upwardly whereby vertical oscillations of said impact bar relative to said spring fingers is prevented.

12. A bumper comprising an impact bar, a supporting bar spaced therefrom, means pivotally connecting the ends of said bars, a row of spring fingers unitarily associated with said supporting bar and provided with end portions adapted to movably engage said impact bar, a row of strap members rigidly connected to said impact bar and provided with resilient offset portions laterally spaced from said impact bar there being a strap for each spring finger, said resilient strap portions projecting over and embracing the movable portions of said spring fingers to guide the same.

VILLOR P. WILLIAMS.